United States Patent
Jaecksch et al.

(10) Patent No.: US 8,356,027 B2
(45) Date of Patent: Jan. 15, 2013

(54) HYBRID QUERY EXECUTION PLAN GENERATION AND COST MODEL EVALUATION

(75) Inventors: Bernhard Jaecksch, Wiesloch (DE); Franz Faerber, Walldorf (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 12/972,360

(22) Filed: Dec. 17, 2010

(65) Prior Publication Data
US 2012/0089595 A1    Apr. 12, 2012

Related U.S. Application Data

(60) Provisional application No. 61/391,007, filed on Oct. 7, 2010.

(51) Int. Cl.
*G06F 17/30* (2006.01)

(52) U.S. Cl. ......... 707/713; 707/715; 707/802; 707/805

(58) Field of Classification Search .......... 707/713–716, 707/802–805
See application file for complete search history.

(56) References Cited

U.S. PATENT DOCUMENTS

| | | | |
|---|---|---|---|
| 5,694,591 A * | 12/1997 | Du et al. ............................ 1/1 |
| 5,875,334 A * | 2/1999 | Chow et al. .................. 717/141 |
| 5,978,789 A * | 11/1999 | Griffin et al. ........................ 1/1 |
| 6,061,676 A * | 5/2000 | Srivastava et al. ............ 707/694 |
| 6,298,342 B1 * | 10/2001 | Graefe et al. ................. 707/602 |
| 6,745,174 B2 * | 6/2004 | Levy et al. .................... 707/702 |
| 7,080,062 B1 * | 7/2006 | Leung et al. ........................ 1/1 |
| 2002/0116357 A1 * | 8/2002 | Paulley .............................. 707/1 |
| 2003/0093424 A1 * | 5/2003 | Chun et al. ........................ 707/7 |
| 2004/0117359 A1 * | 6/2004 | Snodgrass et al. ................ 707/3 |
| 2005/0004907 A1 * | 1/2005 | Bruno et al. ...................... 707/4 |
| 2005/0065921 A1 * | 3/2005 | Hrle et al. ......................... 707/3 |

(Continued)

FOREIGN PATENT DOCUMENTS

GB       2 290 893       *    1/1996

OTHER PUBLICATIONS

Victor Cuevas-Vicenttin "Hybrid Query Processing through Services Composition", EDBT 2008, pp. 75-82, Workshop '08 Mar. 25, 2008, Nantes, France.*

(Continued)

*Primary Examiner* — Srirama Channavajjala
(74) *Attorney, Agent, or Firm* — Mintz, Levin, Cohn, Ferris, Glovsky and Popeo, P.C.

(57) ABSTRACT

A procedural pattern in a received query execution plan can be matched to a stored pattern for which an equivalent declarative operator has been pre-defined. The query execution plan can describe a query for accessing data. A hybrid execution plan can be generated by replacing the procedural pattern with the equivalent declarative operator. A hybrid execution plan processing cost can be assigned to execution of the hybrid execution plan and a query execution plan processing cost can be assigned to execution of the query execution plan. The assigning can include evaluating a cost model for the hybrid execution plan and the query execution plan. The query can be executed using the hybrid execution plan if the hybrid execution plan processing cost is less than the query execution plan processing cost or the query execution plan if the hybrid execution plan processing cost is greater than the query execution plan processing cost. Related systems, methods, and articles of manufacture are disclosed.

20 Claims, 8 Drawing Sheets

U.S. PATENT DOCUMENTS

| | | | |
|---|---|---|---|
| 2006/0259460 A1* | 11/2006 | Zurek et al. | 707/2 |
| 2007/0043696 A1* | 2/2007 | Haas et al. | 707/2 |
| 2008/0154818 A1* | 6/2008 | Bowman | 706/17 |
| 2008/0222087 A1* | 9/2008 | Balmin et al. | 707/2 |
| 2009/0112793 A1* | 4/2009 | Ahmed | 707/2 |
| 2009/0259644 A1* | 10/2009 | Scheuermann | 707/4 |
| 2010/0030758 A1* | 2/2010 | Belknap et al. | 707/4 |
| 2010/0191720 A1* | 7/2010 | Al-Omari et al. | 707/718 |

OTHER PUBLICATIONS

Torsten Grust et al. "Hybrid strategies for query transaltion and optimization", Oct. 1998, pp. 1-31.*

Su Cheng Haw et al. "Query Optimization Techniques for XML Databases", International Journal of Information and Communication Engineering 2:6 2006, pp. 381-388.*

Michael J. Carey et al. "Reducing the Braking Distance of an SQL Query Engine", Proceedings of the 24th VLDB Conference pp. 1-12.*

Yuanchun Zhu et al. "Query Based Hybrid Learning Models for Adaptively Adjusting Locality", WCCI 2012 IEEE World Congress on Computational Intelligence Jun. 10-15, 2012, 8 pages.*

Christopher Kosecki et al. "A Hybrid Reconfiguration Algorithm for Fast Continuous Query Processing", 2009 Sixth International Conference on Information Technology: New Generations, pp. 1668-1669.*

Yin Yang et al. "HybMig: A Hybrid Approach to Dynamic Plan Migration for Continuous Queries", IEEE Transactions on Knowledge and Data Engineering, vol. 19, No. 3, Mar. 2007, pp. 398-411.*

Jaecksch, et al., "Cherry Picking in Database Languages", Proceedings of the 1rth International Symposium on Database Engineering & Applications, IDEAS '10, Aug. 18, 2010, pp. 117-122.

Surajit Chaudhuri, "An Overview of Query Optimization in Relational Systems", Proceedings of the 1998 ACM SIGMOD International Conference on Management of Data, Jun. 1, 1998, pp. 34-43.

European Search Report dated Nov. 18, 2011, for corresponding EP application No. 11005607.4.

* cited by examiner

FIG. 2a
```
1  foreach t in T:
2      if pred(t):
3          ...
```

FIG. 2b.
```
1  foreach t in T:
2      key = tuple()
3      key[i] = c
4      key[j] = t[1]
5      u = lookup(key,T)
```

FIG. 2c.
```
1  foreach t in T:
2      foreach u in T:
3          if pred(u):
4              if cmp(t,u,j):
5                  ...
```

FIG. 2d.
```
1  foreach t in T:
2      foreach u in U:
3          if cmp(t,u,j):
4              ...
```

FIG. 2e.
```
1  foreach t in T:
2      h = tuple()
3      h[0] = 0
4      foreach u in U:
5          if cmp(t,u,j):
6              h[0] = 1
7              ...
8      if h[0] = 0:
9          ...
```

FIG. 2f.
```
1  P = tuplelist()
2  foreach t in T:
3      key = tuple()
4      key[p] = t[p]
5      if !lookup(key,P):
6          add(key,P)
7          ...
```

FIG. 2g.
```
1  u = tuple()
2  foreach t in T:
3      u[m] = u[m] + t[m]
```

FIG. 2h.
```
1  foreach t in T:
2      t[i] = exp1
3      t[N+1] = exp2
```

FIG. 2i.

```
1  v = tuple()
2  v[0] = c
3  foreach t in T:
4      t[i] = v[0]
5      v[0] = t[j]
```

FIG. 2j.

```
1  u = tuple()
2  foreach t in T:
3      u[m] = u[m] * t[m]
```

FIG. 2k.

```
1  foreach t in T:
2      i = tuple()
3      i[0] = 0
4      while(i[0] < t[j]):
5          ...
6          i[0] = i[0] + 1
```

FIG. 3.

```
T              U              Procedural              Declarative
A  2           F  M  5        ┌ A  F  M  2x5 = 10      A  F  M  2x5 = 10
B  3           F  W  7    1.  │ A  F  W  2x7 = 14      A  F  W  2x7 = 14
               G  M  10   iter│ A  G  M  2x10 = 20     A  G  M  2x10 = 20
               G  W  9    ation└ A  G  W  2x9 = 18     A  G  W  2x9 = 18
                              ┌ B  F  M  3x10 = 30  T  B  F  M  3x5 = 30
foreach t in T:           2.  │ B  F  W  3x14 = 42  x  B  F  W  3x7 = 42
  foreach u in U:         iter│ B  G  M  3x20 = 60  U  B  G  M  3x10 = 60
    u[2] = u[2]*t[1]      ation└ B  G  W  3x18 = 54     B  G  W  3x9 = 54
```

FIG. 4.

```
1   DATA actper TYPE fiscper;
2   DATA fiscper TYPE fiscper;
3   DATA sum TYPE FLOAT;
4   DATA delta TYPE FLOAT;
5   // Read value from application variable period
6   actper = varv( 'PERIOD' );
7   // Calculate the sum
8   FOREACH fiscper:
9     IF fiscper > actper:
10      sum = sum + { revenue, 1, fiscper };
11    ENDIF;
12  ENDFOR;
13  // Delta between planned and actual
14  delta = {revenue, 1, actper}
15        - {revenue, 0, actper};
16  // Set planned to actual
17  {revenue, 1, actper} = {revenue, 0, actper};
18  // Distribute delta by weight
19  FOREACH fiscper:
20    IF fiscper > actper:
21      {revenue, 1, fiscper} =
22                {revenue, 1, fiscper} + delta *
23                {revenue, 1, fiscper} / sum;
24    ENDIF;
25  ENDFOR;
```

FIG. 5.

|  | Jan | Feb | Mar | Apr | May | Jun | Jul | Aug | Sep | Oct | Nov | Dec |
|---|---|---|---|---|---|---|---|---|---|---|---|---|
| Version 0 | 1486 | 1326 | 1745 | 1732 | - | - | - | - | - | - | - | - |
| Version 1 (before) | 1486 | 1326 | 1745 | 1790 | 1900 | 2000 | 1950 | 2050 | 1600 | 1700 | 1900 | 2100 |
| Version 1 (after) | 1486 | 1326 | 1745 | 1732 | 1907.25 | 2007.63 | 1957.44 | 2057.82 | 1606.11 | 1706.49 | 1907.25 | 2108.01 |

HYBRID QUERY EXECUTION PLAN GENERATION AND COST MODEL EVALUATION

CROSS-REFERENCE TO RELATED APPLICATION

This application claims priority to U.S. Provisional Patent Application No. 61/391,007, filed on Oct. 7, 2010 and entitled "Turning a Procedural Doman-Specific-Query-Language (DSQL) Into a Hybrid Data-Flow Graph," the disclosure of which is incorporated herein by reference in its entirety.

TECHNICAL FIELD

The subject matter described herein relates generally to data processing and, in particular, to generating a hybrid data flow execution plan based on domain specific query language for obtaining and transforming data from a database.

BACKGROUND

In software development or domain engineering, a domain-specific language is a programming language or a specification language dedicated to a particular problem domain, a particular problem representation technique, and/or a particular solution technique. A domain-specific language is created to solve problems in a particular domain and might not be intended to solve problems outside it.

Many applications provide domain-specific-query-languages ("DSQL") to allow users to express custom and often data-intensive business logic. Various traditional relational databases provide a limited set of options for executing business logic within a database. Some of these include various procedures and/or a series of complex queries coupled together with code. However, these methodologies are generally either part of the application implementation and therefore unchangeable by the user to implement custom functions or require the user to deal with general stored procedure languages and database internals to develop custom business logic. Additional problems can arise if all business logic is expressed on application side. As a result, large amounts of data are transferred between an application and a database, which can be time consuming and can prevent users from experiencing a full potential of a dataset.

Relational databases can be reliable and scalable as well as can be based on SQL in order to provide a standardized and powerful query language. However, some recent trends in the technology of relational database have been trying to differentiate themselves from classic relational database management systems. One of these trends includes NoSQL database management systems which might not require fixed table schemas, usually avoid join operations and typically scale horizontally. While the classic relational database model systems works well for most enterprise applications, there exist applications where specific query languages can be provided to the user for easy interaction with the data stored in a database. Thus, to keep a user within confined boundaries of an application domain, no SQL may be needed. The DSQL systems allow users to develop data-intensive processing logic in a domain specific non-SQL language that still benefits from execution within a database, thereby allowing access to the database.

SUMMARY

In one aspect, a computer-implemented method includes receiving a query execution plan describing a query for accessing data and including a procedural pattern. The procedural pattern is matched to a stored pattern for which an equivalent declarative operator has been pre-defined. A hybrid execution plan is generated by replacing the procedural pattern with the equivalent declarative operator. A hybrid execution plan processing cost is assigned to execution of the hybrid execution plan and a query execution plan processing cost is assigned to execution of the query execution plan. The assigning includes evaluating a cost model for the hybrid execution plan and the query execution plan. The query is executed using the hybrid execution plan if the hybrid execution plan processing cost is less than the query execution plan processing cost or the query execution plan if the hybrid execution plan processing cost is greater than the query execution plan processing cost.

In some variations one or more of the following can optionally be included. A second hybrid execution plan can be generated by replacing a different procedural pattern with a second equivalent declarative operator. A second hybrid execution plan processing cost can be assigned to execution of the second hybrid execution plan by evaluating a cost model for the second hybrid execution plan. The query can be executed using the second hybrid execution plan if the second hybrid execution plan processing cost is less than both of the query execution plan processing cost and the hybrid execution plan processing cost.

The matching can further include applying tuple calculus to identify the procedural statement for replacement by the pre-defined equivalent declarative statement. Evaluating the cost model can include determining the hybrid execution plan processing cost and the query execution plan processing cost using functions that include:

$$\text{Cost} = \Sigma_k^{N_0-N_P} c_{decl} + \Sigma_m^{N_P} c_m^{proc} + \Sigma^{C_{parop}}/\min(P_C, P_p)$$

where $\Sigma_k^{N_0-N_P} c_{decl}$ represents a first sum of costs for all declarative statements, $\Sigma_m^{N_P} c_m^{proc}$ represents a second sum of costs for all procedural statements, and $\Sigma^{C_{parop}}/\min(P_C, P_p)$ represent a third sum of costs for all procedural and/or declarative operators that are calculated in parallel as divided by a minimum number of available parallel processors ($P_C$) and parallel operators ($P_P$). The equivalent declarative operator can include at least one of a selection declarative operator, a join declarative operator, a leftouter-join declarative operator, a projection declarative operator, an aggregation declarative operator, and an assign declarative operator.

A second procedural pattern in the query plan can be translated to a second equivalent declarative operator in the hybrid execution plan. The translating can include identifying a borderline procedural pattern associated with a side effect when the borderline procedural pattern is executed. The side effect can enable a condition that when a first tuple element value is changed during a loop iteration of the borderline procedural pattern, the changed tuple element value is accessed in a subsequent loop iteration such that access of the changed tuple element value rather than access of the first tuple element value prevents the borderline procedural pattern to be translated to an equivalent declarative operator.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2*a-k* illustrate various exemplary query operators;

FIG. 3 illustrates differences between results of executing procedural query language and declarative query language;

FIG. 4 illustrates an exemplary execution of a data query plan;

FIG. 5 illustrates results of executing the data query plan shown in FIG. 4;

When practical, similar reference numbers denote similar structures, features, or elements.

DETAILED DESCRIPTION

There is a need for creating a faster and more efficient way to access data stored in a database using custom business logic. Further, there is a need to allow for a faster and more efficient way of accessing database-stored data using a domain specific query language ("DSQL") by developing and executing an optimal hybrid data flow plan.

To address these and potentially other deficiencies of currently available solutions, one or more implementations of the current subject matter provide methods, systems, articles or manufacture, and the like that can, among other possible advantages, provide systems and methods for providing systems, methods, and computer program products for accessing and processing database-stored data using queries. Some implementations of the current subject matter can be configured to translate a DSQL into a hybrid data-flow execution plan containing declarative operators mixed with procedural operators and to provide runtime comparisons for both types. Further, a general tuple calculus that captures declarative and procedural semantics can be implemented to devise a cost model that can be used to guide the translation process into an optimal hybrid plan.

Figure 1:
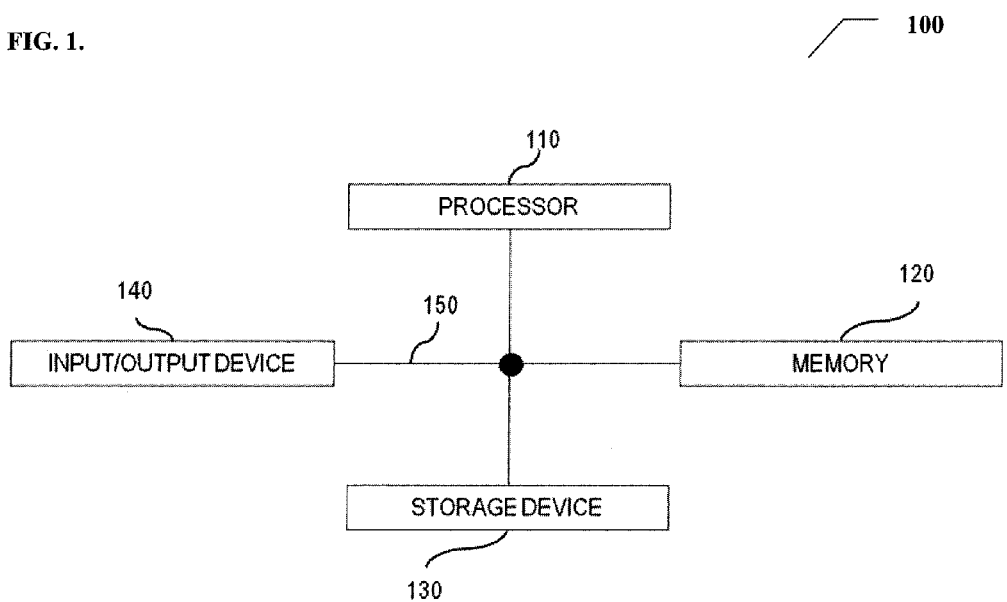
FIG. 1 illustrates an exemplary system for defining and monitoring business conduct, according to some implementations of the current subject matter.

In some implementations, the current subject matter can be configured to be implemented in a system 100, as shown in FIG. 1. The system 100 can include a processor 110, a memory 120, a storage device 130, and an input/output device 140. Each of the components 110, 120, 130 and 140 can be interconnected using a system bus 150. The processor 110 can be configured to process instructions for execution within the system 100. In some implementations, the processor 110 can be a single-threaded processor. In alternate implementations, the processor 110 can be a multi-threaded processor. The processor 110 can be further configured to process instructions stored in the memory 120 or on the storage device 130, including receiving or sending information through the input/output device 140. The memory 120 can store information within the system 100. In some implementations, the memory 120 can be a computer-readable medium. In alternate implementations, the memory 120 can be a volatile memory unit. In yet some implementations, the memory 120 can be a non-volatile memory unit. The storage device 130 can be capable of providing mass storage for the system 100. In some implementations, the storage device 130 can be a computer-readable medium. In alternate implementations, the storage device 130 can be a floppy disk device, a hard disk device, an optical disk device, a tape device, non-volatile solid state memory, or any other type of storage device. The input/output device 140 can be configured to provide input/output operations for the system 100. In some implementations, the input/output device 140 can include a keyboard and/or pointing device. In alternate implementations, the input/output device 140 can include a display unit for displaying graphical user interfaces.

Some implementations of the current subject matter are directed to processing of data queries based on a procedural description in a more efficient way by devising a query execution plan that combines procedural query language and declarative query language that can include various regular expressions, logic programming, and/or functional programming. Using a combination of procedural and declarative query languages, the current subject matter can be configured to allow a database layer to provide infrastructure to handle complex data processing tasks and move such tasks from an application layer to the database layer and hence, closer to the actual data requested in a query. This reduces costs associated with transferring large quantities of data between the application and database layers. In some implementations, all data processing logic can be executed in the database layer and by a "lightweight" (one that does not require substantial processing or an increase in cost) application that coordinates the tasks and displays results of the query to a user. Some implementations of the current subject matter can be used in business planning applications for implementing custom planning functions.

One way to implement complex data processing queries directly within a database layer can involve use of various stored procedures. However, such procedures can be targeted towards application developers or system administrators, whereas use of the DSQL-based queries can allow an application user to implement its custom application logic during application runtime. To accomplish this, some implementations of the current subject matter can be configured to translate a procedural DSQL query into a declarative execution model of the underlying database in order to create a hybrid query execution plan that can incorporate declarative and procedural logic into a single plan. At least some procedural logic involved in the plan can be expressed in an entirely declarative way. Based on this plan, a cost model can be derived that can be used to perform requisite translations of DSQL query in order to develop an optimal hybrid query execution plan. The cost model can target an in-memory system and thereby, reduce operator runtime costs. Further, the cost model can operate on a level of a logical execution plan and thus, does not incorporate various low level features, including but not limited to, cache sizes and cache hierarchies.

The following provides an illustrative discussion of a general procedural tuple calculus concept that can be used to generate a hybrid query execution plan, according to some implementations of the current subject. A general procedural tuple calculus can serve as the framework to express data driven procedural query scripts. It can allow for translation between procedural and declarative parts of the query script and also can enable building a unified cost model.

A basic entity of this calculus is a tuple, t. Each element of the tuple can be accessed by position i as in t[i] or by a unique name that references a certain tuple position—t[name]. Using assignment operator ":=", a new value can be assigned to a tuple component. On a right-hand side of an assignment, an arbitrary arithmetic expression of tuple components or constants can be allowed. A number of components in a tuple can be denoted as N. If a tuple is assigned a component position larger than its current size N or an unknown position name, then the tuple can be extended with a new value of component N+1, which can be referred to by a new position name. Multiple tuples can form list(s) T. A foreach statement (i.e., a statement that traverses data in a collection of data) can iterate over each tuple in such list(s). New tuple lists can be constructed using tuplelist( ) function. A statement add(t, T) can add tuple t to a tuple list T. Further, to allow for conditional control flow, if conditions can evaluate a predicate pred on one or more tuples. A tuple comparison function $cmp(t_i, t_j, c_{cmp})$ can compare tuple $t_i$ and $t_j$ for each component given in tuple $c_{cmp}$. New tuples can be constructed using tuple( ). A function lookup($t_{key}$, T) can find a tuple in a tuple list such that $cmp(t_{key}, t, c_{cmp})$=true and $c_{cmp}$ can contain all component position names of the key tuple. A while(pred(t)) loop can iterate as long as the predicate pred(t) is true.

Some implantations of the current subject matter can be configured to translate a data-driven procedural DSQL query into a semantically equivalent hybrid execution plan. The hybrid plan can provide a set of common declarative operators like projection, selection, join and aggregation (each of which is discussed below and illustrated in connection with FIGS. 2a-2k). These operators can be optimized to process even large input datasets efficiently. Thus, it is desirable to express procedural logic that can operate on large datasets in terms of the declarative operators.

FIGS. 2a and 2b illustrate use of an equivalent of a declarative selection operator expressed with the tuple calculus for a simple selection and selection with lookup, respectively. The selection operator can iterate over each tuple in its input and check if its selection predicate is true for the current tuple. Given a list of tuples T and a predicate pred it can be written as shown in FIG. 2a. A special form of predicate can check for certain components i of a tuple u to determine if they are equal to some constant value c or equal to the component values j of the current tuple t within a loop. This form of selection can be expressed using a lookup function, as shown in FIG. 2b.

FIGS. 2c and 2d illustrate use of an equivalent of a declarative selection operator expressed with the tuple calculus with a join and a join, respectively. The join in combination with a selection is similar to the selection with lookup shown in FIG. 2b. Every join can be a nested loop over two tuple lists. One of the simplest forms of the join (in terms of a procedural description) is a Cartesian product. An outer loop of the join can iterate over all tuples t in a tuple list T and an inner loop can iterate over each tuple u in a list U. If the join involves a number of join attributes described by tuple j, then the description can be extended with a condition in the inner loop that compares the join components defined by tuple j for each combination of tuples t and u, as shown in FIG. 2d. In case of a Leftouter-Join, an empty tuple u can be created since no tuple u compares to t, as shown in FIG. 2e.

FIG. 2f illustrates an exemplary projection operator expressed using tuple calculus. The projection operator can project to all components p of a tuple and eliminate duplicates. To handle duplicates, a list P can be used in combination with a lookup function. If the current tuple t is not found in P, it can be added to P.

FIG. 2g illustrates an exemplary aggregation operator expressed using tuple calculus. The aggregation operator can be used when an element m of a tuple t is accumulated over a set of tuples T using tuple u to store the current sum during each iteration.

FIG. 2h illustrates an exemplary assign operator, which can be a special case of the projection operator. In this case, instead of restricting components of a tuple, the assign operator can either redefine an existing component or add a new one. For a tuple t, either a component t[i]=exp or a new component t[N+1]=exp can be assigned the value of expression exp where N is a number of components in the current tuple.

In some implementations, the current subject matter can be configured to translate each of the procedural operators discussed above along with other parts of a DSQL script into their equivalent declarative form. Further, where translation might not be possible, a combination of the procedural and declarative language can be used to create a hybrid query execution plan. The following discussion illustrates procedural borderline scenarios, where translation of the procedural language into declarative language might not be clearly possible because uses of procedural language and declarative language may produce different results.

Although, most procedural constructs can match patterns for declarative operators and can be interchangeable, even subtle changes in the constructs of such statements can break this equality. When procedural logic is expressed using a declarative form, loops can be unrolled implicitly and expressions can be calculated independently for each tuple. As such, no side effects (i.e., during one loop iteration, a tuple element value can be changed and a new value can be accessed in a subsequent loop iteration) can be allowed. Such side effects most often occur when a tuple is used to transport state between calculations during different loop iterations.

FIG. 3 illustrates differences between uses of procedural and declarative languages. In the procedural case, the iterations can be executed sequentially and the second iteration can access the results of the first one. In the declarative case, the loop can be unrolled and materialized with a cross-join before the calculation can take place on each row independently. Thus, each change to a tuple u in the formula can affect different versions of the tuple u. FIG. 2i illustrates an exemplary procedural operator that is not side effect free. This operator can be characterized by the fact that a tuple v is defined outside of a loop, is part of an expression, and is also on the left-hand side of an assignment inside the loop after it has been accessed in the expression.

FIG. 2j illustrates an exemplary procedural aggregation operator having a side effect. The operators shown in FIGS. 2g and 2j can be similar, but the operator shown in FIG. 2j can introduce a tuple outside of the loop and the tuple that is used inside the loop as part of an expression and as the left hand side of an assignment. Thus, the aggregation can be a borderline case of a procedural pattern with a side effect and only because the declarative aggregation operator can internally use a mechanism to carry state information (i.e., an aggregated sum) between multiple iterations. As such, the aggregation operator can be used as declarative equivalent in that special circumstance. However, in some implementations, substitutions of operations with this operator (e.g., multiplication for a sum) can prevent translation into declarative language.

FIG. 2k illustrates an exemplary while loop that cannot be translated into declarative language. The while loop can express semantics like produce M new tuples, which can conflict with semantics of a data-flow declarative plan, where an output of an operator can be determined by the inputs it can receive. An equivalent declarative operator without an input can be a leaf node in a graph, where leaf-nodes can only allow data sources like tables and cubes. The constructs that prevent translation into declarative language of the operator shown in FIG. 2k include a variable used inside the loop to carry state (i.e., it is not side effect free), and a number of iterations of the inner loop that depends on the component value of a tuple (i.e., it can be determined at runtime only).

The following illustrates an exemplary implementation of the current subject system that uses a combination of procedural and declarative statements to develop a hybrid query execution plan based on the tuple calculus concepts discussed above. The DSQL that is used in this example can be from an area of business planning and be part of an integrated business planning functionality. FIG. 4 illustrates an exemplary script for a business logic that can calculate a rolling plan, which can be created multiple times a year as part of business planning (e.g., sales values for a company are planned at the beginning of a year for the next 12 months). As the year proceeds and actual sales results arrive, the planned values can be refined for the remaining months based on a new knowledge of actual sales figures. If the results so far are below the plan, the target for the remaining months can be raised to keep track with the overall goal of the year. If the results are better than planned, the target can be lowered. FIG. 5 illustrates results of the rolling plan that include actual values provided for months of January, February, March, and April. Projected values (Version 1 (before)) are indicated for months of May through December. Based on the received data for January through April, expected values (Version 2 (after)) are adjusted accordingly.

FIG. 4 illustrates how the rolling plan's DSQL can be expressed using the tuple calculus concept discussed above. Using the DSQL, it can be possible to modify and/or create new data within the underlying multidimensional data model, i.e., a cube. A script can reference a cell in the cube through tuples written in curly brackets (e.g., {measure, $dim_1, \ldots, dim_N$}). The first value can address the measure. For each of the cube's dimensions, a dimension value can be specified. In some implementations, formulas within a script can reference only a certain sub-cube and thus, most of the dimensions can be constant for every tuple within the sub-cube. The division of the cube in fixed dimensions and variable dimensions can relieve the user from specifying dimension values for each dimension of the cube. The fixed dimensions can describe the sub-cubes for which the script can be executed and only the variable dimensions can be necessary to describe a tuple. This means that for each script, there is an implicit loop over all possible sub-cubes as defined by the fixed dimensions. Referring to FIG. 4, the fixed dimensions are a customer and a product. Thus, each distinct combination of a customer and a product can define a sub-cube for which the rolling plan script can be calculated. Finally, the type of a variable can be defined in terms of dimension names, which means that a variable can take values from the domain of the dimension it refers to and can share the same type.

Figure 6:
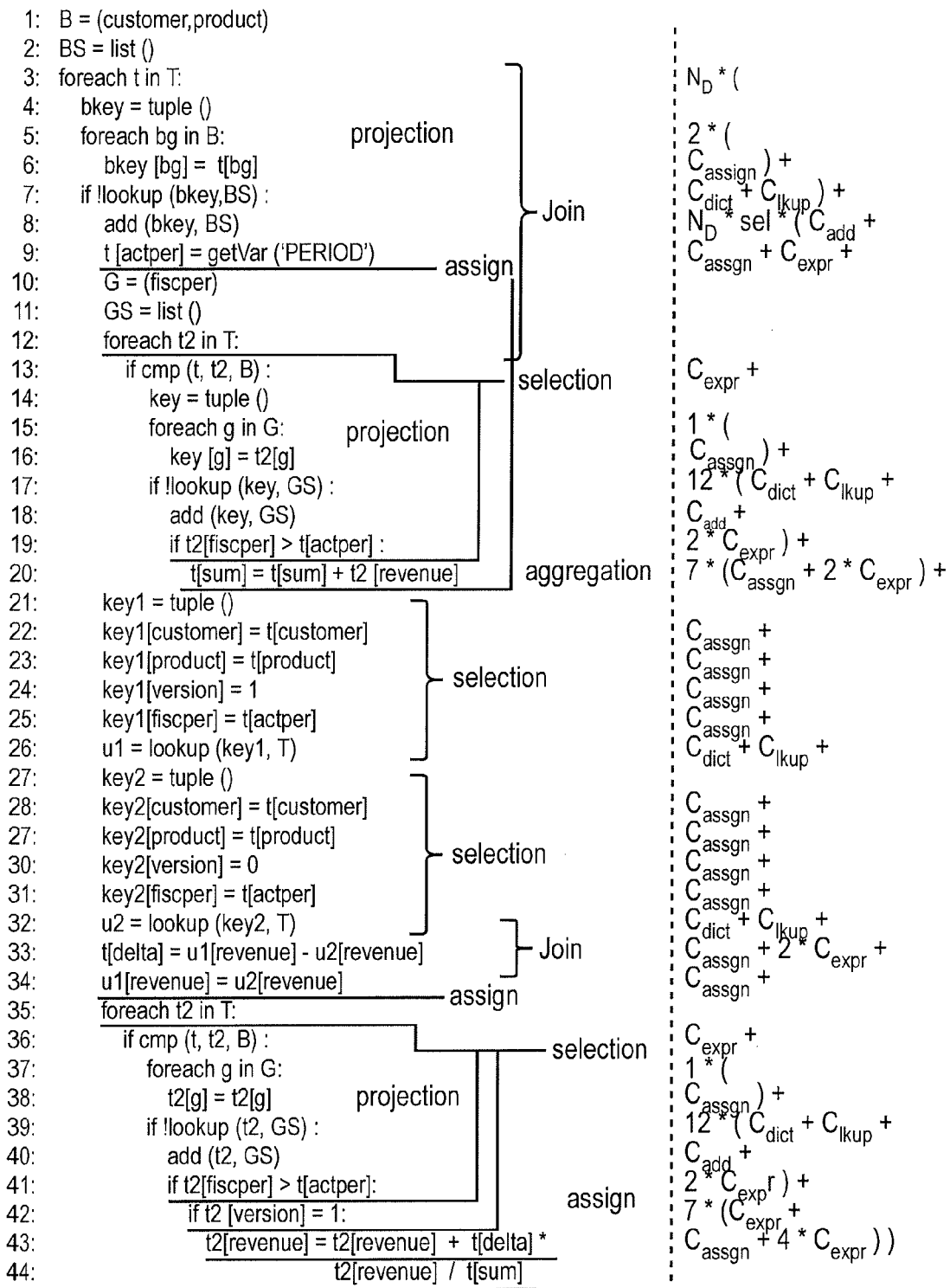
FIG. 6 illustrates the data query plan shown in FIG. 4 as expressed with simple tuple calculus and annotated with matching declarative operators.

In FIG. 4, the first loop can be an iteration over all distinct combinations of the fixed dimensions. All logic of the actual script can be executed in the context of this loop. The second loop corresponds to the first FOREACH statement in the example script. It loops over all distinct values of the fiscal period dimension within the current sub-cube. Within the loop the IF statement and the assignment to variable SUM are expressed. For the calculation of the DELTA value, two look-ups can be performed. Then, the old value in version 0 is overwritten with the value of version 1. Finally, there is another iteration over all fiscal period values, again with the IF statement inside and the assignment and calculation of the new plan value for the current fiscal period. The complete script written with the introduced tuple calculus is shown in FIG. 6. Every pattern that matches a declarative operator is annotated in this figure. As can be seen, the whole script can be completely translated into declarative operators.

In some implementations, an exemplary cost model can be generated using the declarative query language to determine effectiveness of a hybrid query execution plan or a plan that contains purely declarative query language. The cost model can depend on the size of input data and type(s) that are accessed during execution of the plan. It should be noted that for small sizes of data, a single procedural node capturing the complete custom logic can be most efficient. However, when cardinalities (i.e., sizes of data) grow, plans with declarative operators can be more beneficial, because they can be better parallelized and the operators can be optimized to handle larger datasets more efficiently. Between the small size data and large size data, hybrid plans using declarative and procedural operators discussed above can also be beneficial, as long as the separation of the remaining procedural code parts does not lead to procedural operators with only a small portion of code. The cost model discussed below can be configured to weigh these different variants against each other and derive an optimal hybrid execution plan that can handle complex scripts on large data sets.

The cost model can be configured to consider various dimensions that can influence execution cost of such hybrid plan. First, the cost can depend on the size $N_D$ of the input data set. Further, the cost can depend on a structure of the hybrid plan. This means that the separation of procedural parts into multiple procedural operators can be penalized with some overhead cost for each procedural operator $N_P$. $N_O$ can correspond to the number of all operators, such that the number of declarative operators is $N_O-N_P$. Multiple nodes (e.g., declarative and/or procedural) in the hybrid plan that do not depend on each other, can be executed in parallel. The cost can also depend on a degree of parallelism $P_C$ in terms of available processors and a degree of parallel operators in the resulting hybrid plan $P_P$ (i.e., processors and/or operators that can perform various tasks in parallel, respectively). A cost function can be defined as follows, where the resulting cost measure is a real number:

$$C_{plan}(S, N_D, N_O, N_P, P_C, P_O) \rightarrow R \qquad (1)$$

Table 1 summarizes the input parameters.

TABLE 1

Input Parameters.

| Parameter | Description |
|---|---|
| $N_D$ | Size of input data |
| $N_O$ | Number of operators |
| $N_P$ | Number of procedural operators |
| $P_C$ | Number of processors |
| $P_O$ | Number of parallel operators |

While the input parameters $N_D$ and $P_C$ cannot be influenced by the translation process, the parameters $N_P$ and $P_P$ are subject to change depending on the resulting hybrid plan. To measure the costs of a plan based on the tuple calculus each statement or statement block, in case of nested statements, is assigned a cost. In the simplest case of serial execution within one procedural operator the cost is the sum of costs of all statement blocks $c_{stmt}(N_D)$.

$$Cplan(S, N_D, N_O, P_C, P_p) = \Sigma_s^S (c_{stmt}(s, N_D)) \qquad (2)$$

The number of processors has no influence in this case and the number of parallel elements in the resulting plan is 1.

The cost can be quantified for each type of statement of the tuple calculus discussed above. There can be two classes of statements: simple statements such as assignments, expressions or calling the lookup or add function, conditional statements, and blocking statements for blocking statements such as foreach or while. The cost of simple statements can be constant (with the exception of the expression cost) and can be added up to arrive at the final costs, while blocking statements themselves do not incur any costs but multiply the costs for all sub-statements depending on the number of iterations that are performed. Table 2 illustrates the costs for all statements (first part—simple statements; second part—blocking statements).

TABLE 2

Costs of Statements.

| Statement | Cost | Description |
|---|---|---|
| Assignment | $c_{assign}$ | Assignment cost |
| Expression | $o * c_{expr}$ | o is the number of operands in the expression |
| Lookup( ) | $c_{lkp}$ | cost of lookup function |
|  | $c_{dict}$ | initial cost of building dictionary, depends on $N_D$ |
| Add( ) | $c_{add}$ | cost of add function |
| Foreach While | $i * \sum_{s'}^{S'} c_{stmt}(s')$ | S' is the list of sub-statements of the loop statement and i is the number of iterations |

As shown in Table 2, the costs of blocking statements depend on the number of loop iterations and costs of its sub-statements. As can be seen, the costs for the simple statements and blocking statements do not directly depend on the size of the input data. However, each script can start with a loop over its input data, thus, the size $N_D$ of the input data can determine the number of loop iterations i. The costs for all sub-statements of this loop can be multiplied with this number and thus can indirectly depend on it.

To make a decision between a procedural script block and its declarative counterpart, each declarative operator can have an assigned cost. For example, each declarative operator discussed above can have an associated cost that can depend on the input data size and optionally a second input parameter. Table 3 illustrates separate costs for each operator.

TABLE 3

Operator Costs.

| Operator | Cost |
|---|---|
| Selection | $c_{sel}(N_D, sel)$ |
| Join | $c_{join}(N_{Left}, N_{Right})$ |
| Projection | $c_{prj}(N_D)$ |
| Aggregation | $c_{agg}(N_D)$ |
| Assign | $c_{assgn}(N_D)$ |
| Assignmerge | $c_{assgnmerge}(N_D)$ |

In contrast to the cost for simple statements that do not directly depend on $N_D$, each declarative operator can be modeled depending on its input size. For the join operator, this means that it depends on the size of its left and right input. The selection operator can also have a second parameter which can be the selectivity of its predicate. Furthermore, for some operators, such as aggregation, join, and/or projection operators, there can exist some minimal cost for executing such operator even for a very small input size.

To calculate the cost for a hybrid plan, the costs for each declarative operator can be summed up together with the costs for all contained procedural operators. For each procedural operator, the cost of the contained script can be calculated by accumulating the cost of every basic statement multiplied by the number of iterations of encompassing looping statements. If the plan contains declarative and/or procedural operators that are independent of each other and can be calculated in parallel, the costs of the respective operators can be divided by the degree of parallelism determined by the minimum of the number of available processes and the number of parallel operators. Thus, the formula for the overall cost can be as follows, where $\Sigma_k^{No-Np} c_{decl}$ represents a sum of costs for all declarative statements in the generated plan (whether translated or already existing), $\Sigma_m^{Np} c_m^{proc}$ represents a sum of costs for all procedural statements in the generated plan; $\Sigma^{cparop}/\min(P_C, P_P)$ represents a sum of costs for all operators (procedural and/or declarative) that are calculated in parallel as divided by a minimum number of available parallel processors and parallel operators:

$$\text{Cost} = \Sigma_k^{No-Np} c_{decl} + \Sigma_m^{Np} c_m^{proc} + \Sigma^{cparop}/\min(P_C, P_P) \qquad (3)$$

An experiment consistent with one or more implementations of the current subject matter illustrates some of the advantages of using a hybrid query execution plan and a cost model discussed above. Measurable quantities for different operator cost functions in the above-referenced cost model were obtained and predictions of the discussed cost model against experimental results were validated. To do so, execution time was measured for each declarative operator for different input sizes. Further, for a selection operator, selectivity of the selection predicate was varied and for a join operator, different input sizes for left and right inputs were measured. During this experiment, operator runtimes with a physical plan optimizer turned off were measured to ensure that the physical execution plan closely resembles the logical execution plan. The measured operators were not optimized or combined with other operators.

Execution times of procedural patterns and their matching declarative counterparts were compared for different input sizes $N_D$. For smaller data sets, the experiment indicated a better performance of the procedural aggregation and projection operators only than their declarative counterparts. For other operators and/or for larger data sets, declarative operators outperformed procedural operators.

Also, measurements of execution time of the script shown in FIG. 4 indicated that use of declarative operators and/or a combination (hybrid) of declarative and procedural operators outperforms plans that use procedural operators, thereby validating the cost model. Hence, use of hybrid plans and/or plans that contain declarative operators reduces execution costs.

Figure 7:
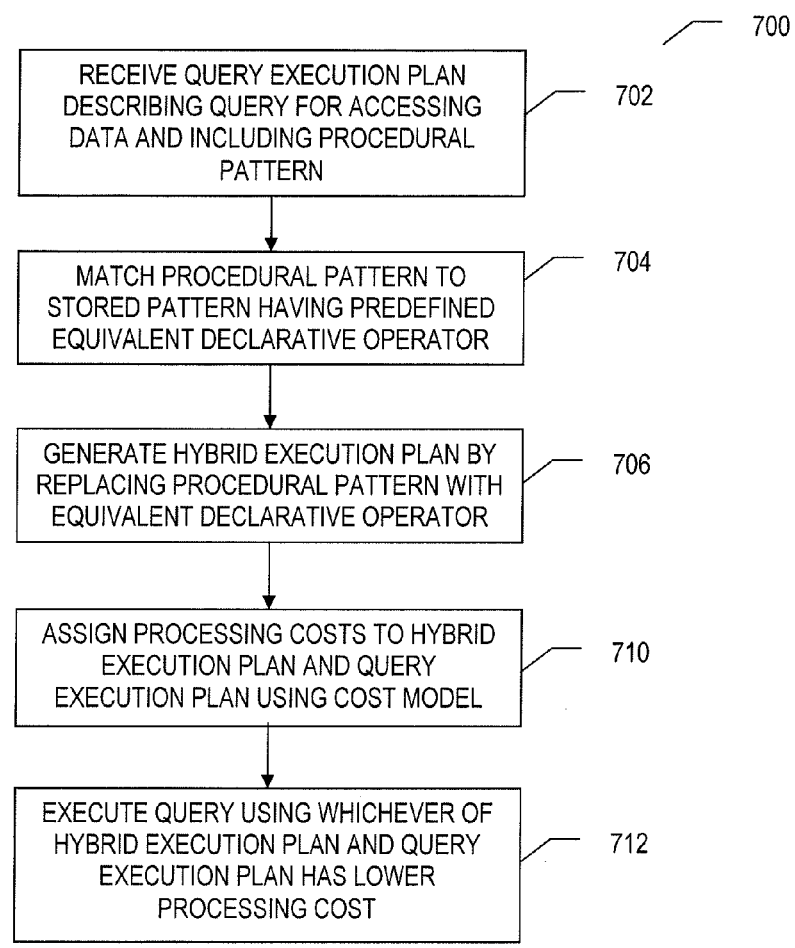
FIG. 7 shows a flow chart illustrating features of a method.

FIG. 7 illustrates features of a method 700 consistent with implementations of the current subject matter. At 702, a query execution plan describing a query for accessing data is received, for example at a processing system that includes one or more processors. The query execution plan includes a procedural pattern that, at 704 is matched to a stored pattern for which an equivalent declarative operator has been predefined. At 706, a hybrid execution plan is generated by replacing the procedural pattern with the equivalent declarative operator. At 710, a hybrid execution plan processing cost is assigned to execution of the hybrid execution plan and a query execution plan processing cost is assigned to execution of the query execution plan. The assigning can include evaluating a cost model for the hybrid execution plan and the query execution plan. The query is executed at 712 using either the hybrid execution plan or the query execution plan according to which has the lower processing cost. The cost model can include a cost corresponding to processing time of the query execution plan. The cost can be determined based on the formula (3) discussed above.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a machine-readable medium storing instructions that, when executed by at least one programmable processor, cause the at least one programmable processor to perform operations comprising:

receiving a query execution plan describing a query for accessing data and comprising a first procedural construct;

matching the first procedural construct to a stored procedural pattern for which an equivalent declarative operator has been pre-defined, the pre-defined equivalent declarative operator comprising a conversion of procedural logic within the first procedural construct, the conversion comprising implicitly unrolling loops within the procedural logic and independently calculating an expression for each tuple within the procedural logic, use of the pre-defined equivalent declarative operator resulting in avoidance of at least one side effect arising from a tuple within the procedural logic being used to transport state between calculations during loop iterations;

generating a hybrid execution plan, the generating comprising replacing the first procedural construct with the pre-defined equivalent declarative operator such that the hybrid query execution plan comprises a combination of at least one other procedural construct of the query execution plan and the predefined equivalent declarative operator;

assigning a hybrid execution plan processing cost to execution of the hybrid execution plan and a query execution plan processing cost to execution of the query execution plan, the assigning comprising evaluating a cost model for the hybrid execution plan and the query execution plan; and executing the query using the hybrid execution plan after determining that the hybrid execution plan processing cost is less than the query execution plan processing cost or the query execution plan after determining that if the hybrid execution plan processing cost is greater than the query execution plan processing cost.

2. A computer program product as in claim 1, wherein the matching further comprises applying tuple calculus to identify the procedural statement for replacement by the pre-defined equivalent declarative statement.

3. A computer program product as in claim 1, wherein evaluating the cost model comprises determining the hybrid execution plan processing cost and the query execution plan processing cost using functions comprising:

$$\text{Cost} = \Sigma_k^{N_0-N_p} c_{decl} + \Sigma_m^{N_p} c_m^{proc} + \Sigma^{C_{parop}}/\min(P_C, P_p)$$

where $\Sigma_k^{N_0-N_p} c_{decl}$ represents a first sum of costs for all declarative statements, $\Sigma_m^{N_p} c_m^{proc}$ represents a second sum of costs for all procedural statements, and $\Sigma^{C_{parop}}/\min(P_C, P_p)$ represents a third sum of costs for all procedural and/or declarative operators that are calculated in parallel as divided by a minimum number of available parallel processors ($P_C$) and parallel operators ($P_P$).

4. A computer program product as in claim 1, wherein the equivalent declarative operator comprises at least one of a selection declarative operator, a join declarative operator, a leftouter-join declarative operator, a projection declarative operator, an aggregation declarative operator, and an assign declarative operator.

5. A computer program product as in claim 1, wherein the operations further comprise: replacing, in the hybrid execution plan, a second procedural construct in the query plan to a stored second procedural pattern for which a second equivalent declarative operator has been predefined, the replacing comprising identifying that the second procedural construct comprises a borderline procedural construct associated with a second side effect when the borderline procedural construct is executed.

6. A computer program product as in claim 5, wherein the second side effect enables a condition that when a first tuple element value is changed during a loop iteration of the borderline procedural construct, the changed tuple element value is accessed in a subsequent loop iteration such that access of the changed tuple element value rather than access of the first tuple element value prevents the borderline procedural construct to be translated to the second equivalent declarative operator.

7. A computer program product as in claim 1, further comprising:
generating a second hybrid execution plan by replacing a different procedural construct with a second equivalent declarative operator;
assigning a second hybrid execution plan processing cost to execution of the second hybrid execution plan by evaluating a cost model for the second hybrid execution plan; and
executing the query using the second hybrid execution plan upon determining that the second hybrid execution plan processing cost is less than both of the query execution plan processing cost and the hybrid execution plan processing cost.

8. A system comprising:
at least one programmable processor; and
at least one machine-readable medium storing instructions that, when executed by the at least one programmable processor, cause the at least one programmable processor to perform operations comprising:
receiving a query execution plan describing a query for accessing data and comprising a first procedural construct;
matching the first procedural construct to a stored procedural pattern for which an equivalent declarative operator has been pre-defined, the pre-defined equivalent declarative operator comprising a conversion of procedural logic within the first procedural construct, the conversion comprising implicitly unrolling loops within the procedural logic and independently calculating an expression for each tuple within the procedural logic, use of the pre-defined equivalent declarative operator resulting in avoidance of at least one side effect arising from a tuple within the procedural logic being used to transport state between calculations during loop iterations;
generating a hybrid execution plan, the generating comprising replacing the first procedural construct with the pre-defined equivalent declarative operator such that the hybrid query execution plan comprises a combination of at least one other procedural construct of the query execution plan and the predefined equivalent declarative operator;
assigning a hybrid execution plan processing cost to execution of the hybrid execution plan and a query execution plan processing cost to execution of the query execution plan, the assigning comprising evaluating a cost model for the hybrid execution plan and the query execution plan; and
executing the query using the hybrid execution plan after determining that the hybrid execution plan processing cost is less than the query execution plan processing cost or the query execution plan after determining that the hybrid execution plan processing cost is greater than the query execution plan processing cost.

9. A system as in claim 8, wherein the matching further comprises applying tuple calculus to identify the procedural statement for replacement by the pre-defined equivalent declarative statement.

10. A system as in claim 8, wherein evaluating the cost model comprises determining the hybrid execution plan processing cost and the query execution plan processing cost using functions comprising:

$$\text{Cost} = \Sigma_k^{N_0-N_p} c_{decl} + \Sigma_m^{N_p} c_m^{proc} + \Sigma^{C_{parop}}/\min(P_C, P_p)$$

where $\Sigma_k^{N_0-N_p} c_{decl}$ represents a first sum of costs for all declarative statements, $\Sigma_m^{N_p} c_m^{proc}$ represents a second sum of costs for all procedural statements, and $\Sigma^{C_{parop}}/\min(P_C, P_p)$ represents a third sum of costs for all procedural and/or declarative operators that are calculated in parallel as divided by a minimum number of available parallel processors ($P_C$) and parallel operators ($P_P$).

11. A system as in claim 8, wherein the equivalent declarative operator comprises at least one of a selection declarative operator, a join declarative operator, a leftouter-join declarative operator, a projection declarative operator, an aggregation declarative operator, and an assign declarative operator.

12. A system as in claim 8, wherein the operations further comprise: replacing, in the hybrid execution plan, a second procedural construct in the query plan to a stored second procedural pattern for which a second equivalent declarative operator has been predefined, the replacing comprising identifying that the second procedural construct comprises a borderline procedural construct associated with a second side effect when the borderline procedural construct is executed.

13. A system as in claim 12, wherein the second side effect enables a condition that when a first tuple element value is changed during a loop iteration of the borderline procedural construct, the changed tuple element value is accessed in a subsequent loop iteration such that access of the changed tuple element value rather than access of the first tuple element value prevents the borderline procedural construct to be translated to the second equivalent declarative operator.

14. A system as in claim 8, wherein the operations further comprise:
   generating a second hybrid execution plan by replacing a different procedural construct with a second equivalent declarative operator;
   assigning a second hybrid execution plan processing cost to execution of the second hybrid execution plan by evaluating a cost model for the second hybrid execution plan; and
   executing the query using the second hybrid execution plan upon determining that the second hybrid execution plan processing cost is less than both of the query execution plan processing cost and the hybrid execution plan processing cost.

15. A computer-implemented method comprising:
   receiving a query execution plan describing a query for accessing data and comprising a first procedural construct;
   matching the first procedural construct to a stored procedural pattern for which an equivalent declarative operator has been pre-defined, the pre-defined equivalent declarative operator comprising a conversion of procedural logic within the first procedural construct, the conversion comprising implicitly unrolling loops within the procedural logic and independently calculating an expression for each tuple within the procedural logic, use of the pre-defined equivalent declarative operator resulting in avoidance of at least one side effect arising from a tuple within the procedural logic being used to transport state between calculations during loop iterations;
   generating a hybrid execution plan, the generating comprising replacing the first procedural construct with the pre-defined equivalent declarative operator such that the hybrid query execution plan comprises a combination of at least one other procedural construct of the query execution plan and the predefined equivalent declarative operator;
   assigning a hybrid execution plan processing cost to execution of the hybrid execution plan and a query execution plan processing cost to execution of the query execution plan, the assigning comprising evaluating a cost model for the hybrid execution plan and the query execution plan; and
   executing the query using the hybrid execution plan after determining that the hybrid execution plan processing cost is less than the query execution plan processing cost or the query execution plan after determining that the hybrid execution plan processing cost is greater than the query execution plan processing cost.

16. A computer-implemented method as in claim 15, wherein the matching further comprises applying tuple calculus to identify the procedural statement for replacement by the pre-defined equivalent declarative statement.

17. A computer-implemented method as in claim 15, wherein evaluating the cost model comprises determining the hybrid execution plan processing cost and the query execution plan processing cost using functions comprising:

$$\text{Cost} = \Sigma_k^{N_0-N_p} c_{decl} + \Sigma_m^{N_p} c_m^{proc} + \Sigma^{C_{parop}}/\min(P_C, P_p)$$

where $\Sigma_k^{N_0-N_p} c_{decl}$ represents a first sum of costs for all declarative statements, $\Sigma_m^{N_p} c_m^{proc}$ represents a second sum of costs for all procedural statements, and $\Sigma^{C_{parop}}/\min(P_C, P_p)$ represents a third sum of costs for all procedural and/or declarative operators that are calculated in parallel as divided by a minimum number of available parallel processors ($P_C$) and parallel operators ($P_P$).

18. A computer-implemented method as in claim 15, further comprising: replacing, in the hybrid execution plan, a second procedural construct in the query plan to a stored second procedural pattern for which a second equivalent declarative operator has been predefined, the replacing comprising identifying that the second procedural construct comprises a borderline procedural construct associated with a second side effect when the borderline procedural construct is executed.

19. A computer-implemented method as in claim 15, further comprising:
   generating a second hybrid execution plan by replacing a different procedural construct with a second equivalent declarative operator;
   assigning a second hybrid execution plan processing cost to execution of the second hybrid execution plan by evaluating a cost model for the second hybrid execution plan; and
   executing the query using the second hybrid execution plan upon determining that the second hybrid execution plan processing cost is less than both of the query execution plan processing cost and the hybrid execution plan processing cost.

20. A computer-implemented method as in claim 15, wherein at least one of the receiving, the matching, the generating, the assigning, the calculating, and the executing is performed by at least one processor.

* * * * *